US011966247B1

(12) United States Patent
Cicili

(10) Patent No.: US 11,966,247 B1
(45) Date of Patent: Apr. 23, 2024

(54) WIDE-SWING INTRINSIC MOSFET CASCODE CURRENT MIRROR

(71) Applicant: pSemi Corporation, San Diego, CA (US)

(72) Inventor: Rogelio Cicili, San Diego, CA (US)

(73) Assignee: PSEMI CORPORATION, San Diego, CA (US)

( * ) Notice: Subject to any disclaimer, the term of this patent is extended or adjusted under 35 U.S.C. 154(b) by 0 days.

(21) Appl. No.: 18/160,536

(22) Filed: Jan. 27, 2023

(51) Int. Cl.
*G05F 3/26* (2006.01)
*G05F 3/20* (2006.01)

(52) U.S. Cl.
CPC .............. *G05F 3/262* (2013.01); *G05F 3/205* (2013.01)

(58) Field of Classification Search
None
See application file for complete search history.

(56) References Cited

U.S. PATENT DOCUMENTS 4,550,284 A * 10/1985 Sooch .................... G05F 3/262 330/288
4,583,037 A * 4/1986 Sooch .................... G05F 3/262 330/288
5,612,614 A * 3/1997 Barrett, Jr. .............. G05F 3/262 323/314
5,952,884 A * 9/1999 Ide .......................... G05F 3/262 330/288
5,982,206 A * 11/1999 Tachio .................... G05F 3/262 327/427
6,169,456 B1 * 1/2001 Pauls ...................... H03F 3/345 330/296
6,528,981 B1 * 3/2003 Tsubaki .................. H03F 3/345 323/315
6,680,605 B2 * 1/2004 Chen ....................... G05F 3/262 323/315
7,724,077 B2 * 5/2010 Bien ........................ G05F 3/262 327/543
7,859,243 B2 * 12/2010 Lorenz ...................... G05F 3/26 323/313
8,067,287 B2 * 11/2011 Baumgartner .... H01L 29/66659 257/341
9,874,893 B2 * 1/2018 Ciubotaru ................. G05F 1/10
10,496,121 B2 * 12/2019 Wang ........................ G05F 3/26
11,177,803 B2 * 11/2021 Kaur .................... H03K 17/223
(Continued)

*Primary Examiner* — Thomas J. Hiltunen
(74) *Attorney, Agent, or Firm* — Steinfl + Bruno LLP

(57) ABSTRACT

Methods and devices for a wide-swing cascode current mirror with low headroom voltage and high output impedance are presented. An input leg of the current mirror includes a composite transistor in series connection with an intrinsic transistor. The composite transistor includes two series-connected regular transistors with respective sizes that are twice the size of the intrinsic transistor. An output leg of the current mirror includes a regular transistor in series connection with an intrinsic transistor. A gate voltage of the composite transistor, provided at a node that is common to gates of the two series-connected regular transistors, self-establishes when a reference current flows through the input leg. The self-established gate voltage is used to bias the regular transistor of the output leg. Biasing voltages to gates of the intrinsic transistors is provided by an intermediate node that provides the series connection of the regular transistors of the composite transistor.

20 Claims, 5 Drawing Sheets

(56) References Cited

U.S. PATENT DOCUMENTS

| | | | | |
|---|---|---|---|---|
| 2004/0056708 | A1* | 3/2004 | Bedarida | G05F 3/262 327/538 |
| 2007/0290740 | A1* | 12/2007 | Jongsma | G05F 3/262 327/543 |

* cited by examiner

200

400

WIDE-SWING INTRINSIC MOSFET CASCODE CURRENT MIRROR

TECHNICAL FIELD

The present disclosure is related to electronic circuits, and more particularly to cascode current mirrors having low headroom voltage and high output impedance to enable a wide-swing output voltage.

BACKGROUND

With the advent of nanometer scale technologies (i.e., <90 nm), electronic circuits may need to operate at low voltages (e.g., <1.2 volts) due to the lower breakdown voltages of transistors fabricated according to such nanometer scale technologies. Accordingly, analog signal processing may benefit from current-mode, instead of voltage-mode, approaches due to a lower headroom voltage made available by the low voltages of operation. It is therefore expected that current mirrors will take a more important role in current-mode signal processing.

Transistors fabricated according to nanometer scale technologies may however suffer from lower output resistances due to short-channel effects. When used in (an output leg of) a current mirror, a transistor with a lower output resistance may degrade performance of the current mirror and deviate from operation as an ideal current source (e.g., a current source with infinite output/internal resistance).

The above prior art shortcomings are a basis for the teachings according to the present disclosure, including a practical and scalable cascode current mirror with a reduced headroom voltage for a wide-swing output voltage.

SUMMARY

According to a first aspect of the present disclosure, a cascode current mirror circuit is presented, comprising: an input leg comprising a common-source composite transistor in series connection with a first common-gate intrinsic transistor; and an output leg comprising a first common-source transistor in series connection with a second common-gate intrinsic transistor, wherein the composite transistor comprises two series-connected transistors with gates connected at a gate node of the common-source composite transistor, and an intermediate node that connects the two series-connected transistors is connected to gates of the first and second common-gate intrinsic transistors.

According to a second aspect of the present disclosure, a method for operating a cascode current mirror with low headroom voltage is presented, the method comprising: realizing an input leg of the cascode current mirror by series-connecting a common-source composite transistor with a first common-gate intrinsic transistor; realizing an output leg of the cascode current mirror by series-connecting a first common-source transistor with a second common-gate intrinsic transistor; and biasing gates of the first and second common-gate transistors with a voltage at an intermediate node that connects two series-connected transistors of the common-source composite transistor, wherein a ratio between a width and a length of each transistor of the two series-connected transistors is twice a ratio between a width and a length of any one of the first common-source transistor, the first common-gate intrinsic transistor, or the second common-gate intrinsic transistor.

Further aspects of the disclosure are provided in the description, drawings and claims of the present application.

BRIEF DESCRIPTION OF DRAWINGS

The accompanying drawings, which are incorporated into and constitute a part of this specification, illustrate one or more embodiments of the present disclosure and, together with the description of example embodiments, serve to explain the principles and implementations of the disclosure.

Like reference numbers and designations in the various drawings indicate like elements.

DETAILED DESCRIPTION

Throughout the present disclosure, embodiments and variations are described for the purpose of illustrating uses and implementations of inventive concepts of various embodiments. The illustrative description should be understood as presenting examples of the inventive concept, rather than as limiting the scope of the concept as disclosed herein.

A cascode current mirror may increase its output resistance by inclusion of a cascode stack at an output leg of the current mirror. Because the cascode stack includes at least one common-gate (cascode) transistor in series connection (e.g., stacked) with a common-source (input) transistor, operation of the output leg may require a voltage headroom that is equal to the sum of the gate-to-source (Vgs) voltage of the common-source transistor and the overdrive voltage of the common-gate transistor, and therefore may be considered too large for operation with low voltage supplies (e.g., 1.2 volts and below) and/or too limiting with respect to a dynamic range (e.g., swing) of a voltage coupled to the output leg of the current mirror.

One possible design technique to overcome the above shortcoming of a cascode current mirror is through use of one or more dedicated transistor branches (different from the input leg) to generate one or more gate voltages for biasing one or more common-gate (cascode) transistors of the output leg of the current mirror. In this case, operation of the output leg may require a voltage headroom that is approximately equal to the sum of the overdrive voltages of the common-source and common-gate transistor, and therefore sufficiently low for operation with some low voltage supplies (e.g., 1.2 volts and below). However, this potential solution comes at a cost associated with at least one extra/dedicated transistor branch, including larger die area and higher power consumption, the cost increasing with a scaling up of the number of common-gate (cascode) transistors.

Figure 1B:
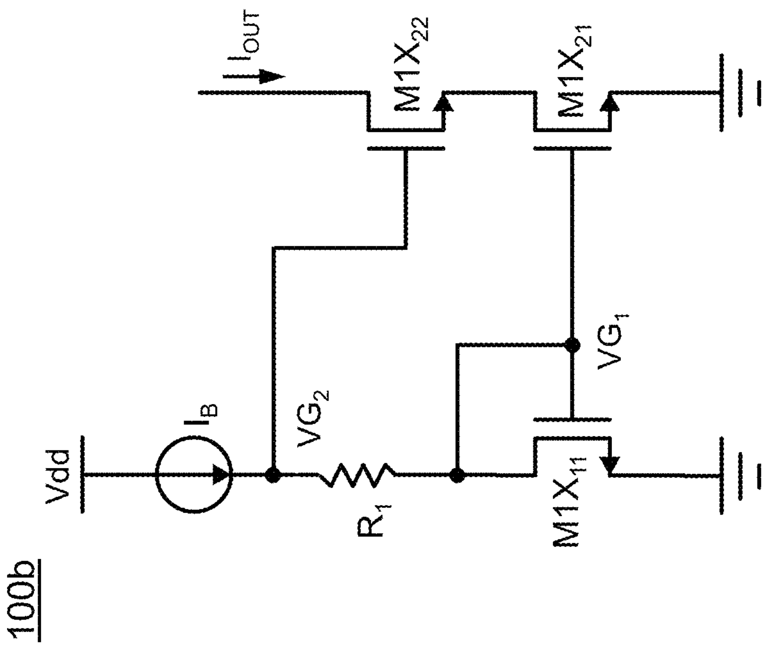
FIG. 1B shows a simplified schematic of another cascode current mirror wherein gate voltages for transistors of the output leg are generated by the input leg.
Figure 1A:
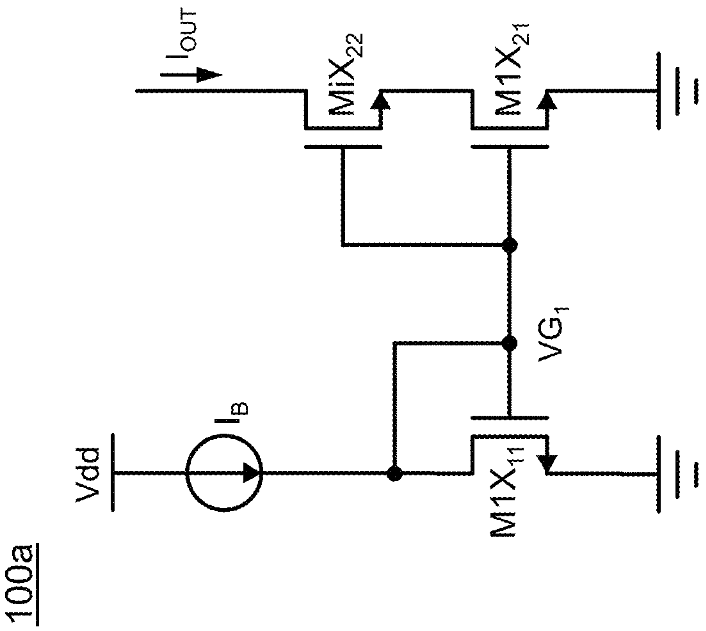
FIG. 1A shows a simplified schematic of a cascode current mirror wherein gate voltages for transistors of the output leg are generated by the input leg.

FIG. 1A shows a simplified schematic of a cascode current mirror (100*a*) including an input leg, ($M1X_{11}$, e.g., reference branch), comprising a common-source (FET) transistor, $M1X_{11}$, and an output leg ($M1X_{21}$, $M1X_{22}$, e.g., output branch) comprising a common-source (FET) transistor, $M1X_{21}$, in series connection with a common-gate (cascode) $MiX_{22}$. A (reference) current source, $I_B$, is coupled to the input leg ($M1X_{11}$). During operation, a current, $I_B$, that flows from the current source, $I_B$, through the input leg ($M1X_{11}$) is mirrored by the output leg ($M1X_{21}$, $MiX_{22}$) and output as an output (sink) current, TOUT.

With continued reference to FIG. 1A, the transistor, $M1X_{11}$, of the input leg ($M1X_{11}$) is in a diode-connected configuration so as to self-bias for conduction of the input current, $I_B$, through such transistor. In other words, because the drain and gate of the transistor, $M1X_{11}$, are connected to one another, the gate voltage, $VG_1$, self-establishes for conduction of the input current, $I_B$, through the transistor, $M1X_{11}$, based for example, on current-voltage characteristics (e.g., I-V curves) of the transistor, $M1X_{11}$. In turn, the gate voltage, $VG_1$, is used to establish gate biasing voltages to the transistors $M1X_{21}$ and $MiX_{22}$ of the output leg ($M1X_{21}$, $MiX_{22}$) for conduction of the output current, $I_{OUT}$.

Use of a common gate voltage (e.g., $VG_1$) for biasing of both transistors, $M1X_{21}$ and $MiX_{22}$, of the output leg ($M1X_{21}$, $MiX_{22}$) is made possible by selection of such transistors to include a "regular" transistor (e.g., $M1X_{21}$) having a size, W/L, provided by a ratio of its width (W) to its length (L), and an "intrinsic" or "native" transistor (e.g., $M1X_{22}$) of a same size. As used in the present disclosure, a regular transistor is a transistor having (regular) positive threshold voltage ($V_{th}$), and an intrinsic transistor is a transistor having a (strictly) negative and non-zero $V_{th}$ voltage, wherein the $V_{th}$ voltage is a gate-to-source voltage that puts the transistor at a limit between conduction and non-conduction. The $V_{th}$ of a regular NMOS FET transistor may be approximately (positive) 500 millivolts or greater, and the $V_{th}$ of an intrinsic NMOS FET transistor may be approximately negative 200 millivolts or less (i.e., more negative). In some embodiments according to the present disclosure, the $V_{th}$ of the intrinsic NMOS FET transistors may be in a range from negative 200 millivolts to negative 250 millivolts.

Accordingly, a regular transistor (e.g., $M1X_{21}$) may operate in a corresponding saturation region for a gate-to-source voltage, Vgs, of about 600 millivolts that is equal to the sum of the (positive) $V_{th}$ voltage of the transistor (e.g., about 500 millivolts) and an overdrive volage, $V_{OV}$, of the transistor (e.g., as low as about 100 millivolts). On the other hand, an intrinsic transistor (e.g., $M1X_{22}$) may operate in a corresponding saturation region for a gate-to-source voltage, Vgs, that is equal to the sum of the (negative) $V_{th}$ voltage of the transistor (e.g., about negative 200 millivolts or less) and an overdrive volage, $V_{OV}$, of the transistor (e.g., as low as about 100 millivolts). Accordingly, such intrinsic transistor may operate in its saturation region for a gate-to-source voltage, Vgs, that is substantially less than 600 millivolts, such as for example, less than 150 millivolts and potentially extending into a negative voltage (depending on the negative value of the $V_{th}$ voltage). It is noted that a necessary condition for operation of a FET transistor in its saturation region (and therefore provision of a high output impedance of the transistor) is a drain-to-source voltage, Vds, that is greater than the overdrive voltage, $V_{OV}$, of the transistor (i.e., $Vds>Vgs-V_{th}$). In other words, a FET transistor, either regular or intrinsic may operate in its saturation region for a Vds voltage that may be as low as about 100 millivolts.

With continued reference to FIG. 1A, the gate voltage, $VG_1$, represents the Vgs and the drain-to-source voltage (Vds) of the transistor $M1X_{11}$, as well as the Vgs of the transistor $M1X_{21}$. On the other hand, the Vds of the transistor $M1X_{21}$ is represented by a difference between the gate voltage, $VG_1$, which is the Vgs of the regular transistor $M1X_{11}$, and the Vgs of the intrinsic transistor $M1X_{22}$. Assuming that $M1X_{11}$ and $M1X_{22}$ operate at similar, or close, values of the corresponding overdrive voltages, $V_{OV}$, then the Vds of the transistor $M1X_{21}$ may be represented by a difference between the (positive) $V_{th}$ of the (regular) transistor $M1X_{11}$ and the (negative) $V_{th}$ of the (intrinsic) transistor $M1X_{11}$. In other words, although the (regular) transistors, $M1X_{11}$ and $M1X_{21}$, may have a same Vgs voltage, they have different Vds voltages, and therefore for a given gate voltage, $VG_1$, a current, $I_B$, that flows through the input leg ($M1X_{11}$) may be (slightly) different from a current, $I_{OUT}$, that flows through the output leg ($M1X_{21}$, $MiX_{22}$). Such difference between currents may in turn cause an undesired systematic offset of the cascode current mirror (100*a*).

Furthermore, since the Vds of the intrinsic transistor $MiX_{22}$ may be at least 100-150 millivolts and the Vds of the transistor $M1X_{21}$ may be larger than its $V_{th}$, then a headroom voltage required for operation of the output leg ($M1X_{21}$, $MiX_{22}$), in other words the sum of the Vds voltages of the transistors $M1X_{21}$ and $MiX_{22}$, may be larger than about 600-650 millivolts. Such relatively large headroom voltage required for operation of the output leg ($M1X_{21}$, $MiX_{22}$) may reduce available voltage swing (dynamic range) for a circuit coupled to the output leg ($M1X_{21}$, $MiX_{22}$).

FIG. 1B shows a simplified schematic of another cascode current mirror (100*b*) including an input leg, ($M1X_{11}$, $R_1$), comprising a common-source (FET) transistor, $M1X_{11}$, that is in series connection with a resistor, $R_1$, and an output leg ($M1X_{21}$, $M1X_{22}$) comprising a common-source (FET) transistor, $M1X_{21}$, in series connection with a common-gate (cascode) $M1X_{22}$. A (reference) current source, $I_B$, is coupled to the input leg ($M1X_{11}$). During operation, a current, $I_B$, that flows from the current source, $I_B$, through the input leg ($M1X_{11}$, $R_1$) is mirrored by the output leg ($M1X_{21}$, $M1X_{22}$) and output as an output (sink) current, $I_{OUT}$.

In contrast to the configuration (100*a*) described above with reference to FIG. 1A, the output leg ($M1X_{21}$, $M1X_{22}$) of the configuration (100*b*) of FIG. 1B does not include an intrinsic transistor as both transistors $M1X_{21}$ and $M1X_{22}$ are regular transistors (i.e., as opposed to intrinsic transistors). Similar to the configuration (100*a*), the gate voltage, $VG_1$, here used for biasing of the common-source transistor $M1X_{22}$ of the output leg ($M1X_{21}$, $M1X_{22}$), self-establishes for conduction of the input current, $I_B$, through the transistor, $M1X_{11}$, of the input leg ($M1X_{11}$, $R_1$). Furthermore, a voltage drop that is based on the conduction of the input current, $I_B$, through the resistor, $R_1$, establishes a gate voltage, $VG_2$, that is used for biasing of the common-gate (cascode) transistor $M1X_{22}$ of the output leg ($M1X_{21}$, $M1X_{22}$).

With continued reference to FIG. 1B, the resistor, $R_1$, may be selected to generate a gate voltage, $VG_2$, that is about one overdrive voltage, $V_{OV}$, greater than the gate voltage, $VG_1$. In other words, the resistor, $R_1$, may be selected so that $VG_2=V_{th}+2V_{OV}$. Accordingly, since the Vgs of the transistor, $M1X_{22}$, may be approximated to $V_{th}+V_{OV}$, then the Vds of the transistor, $M1X_{21}$, may be approximated to $V_{OV}$. In other words, the configuration (100*b*) may allow a reduction of the headroom voltage required for operation of the output leg (e.g., $M1X_{21}$, $M1X_{22}$) when compared to the configuration (100*a*) of FIG. 1A. However, similarly to the configuration (100*a*), the configuration (100*b*) operates the common-source transistors, $M1X_{11}$ and $M1X_{21}$, at different Vds voltages which may lead to a systematic offset.

Furthermore, because the voltage drop across the resistor, $R_1$, has a linear dependence to the value of the current, $I_B$, and the voltage $VG_1$ (e.g., $V_{OV}$ of transistor $M1X_{11}$) has a square root dependence to the value of the current, $I_B$, a variation in the current, $I_B$, may result in a shift of operating points of the transistors $M1X_{21}$ and $M1X_{22}$, such that, for example, the Vds voltages of the common-source transistors $M1X_{11}$ and $M1X_{21}$ may not track one another. In addition, process, voltage, and temperature (PVT) based variations may affect characteristics (e.g., resistance) of the resistor, $R_1$, differently from the characteristics (e.g., current-voltage) of the transistors used in the cascode current mirror (100*b*), thereby producing similar shifts of the operating points of the transistors $M1X_{21}$ and $M1X_{22}$, with similar effects. Finally, presence of a resistor (e.g., $R_1$) in a cascode current mirror may be undesirable due to its larger die area requirement, especially in low current applications where larger resistors may be required to generate a desired voltage drop across the resistor.

Figure 2:
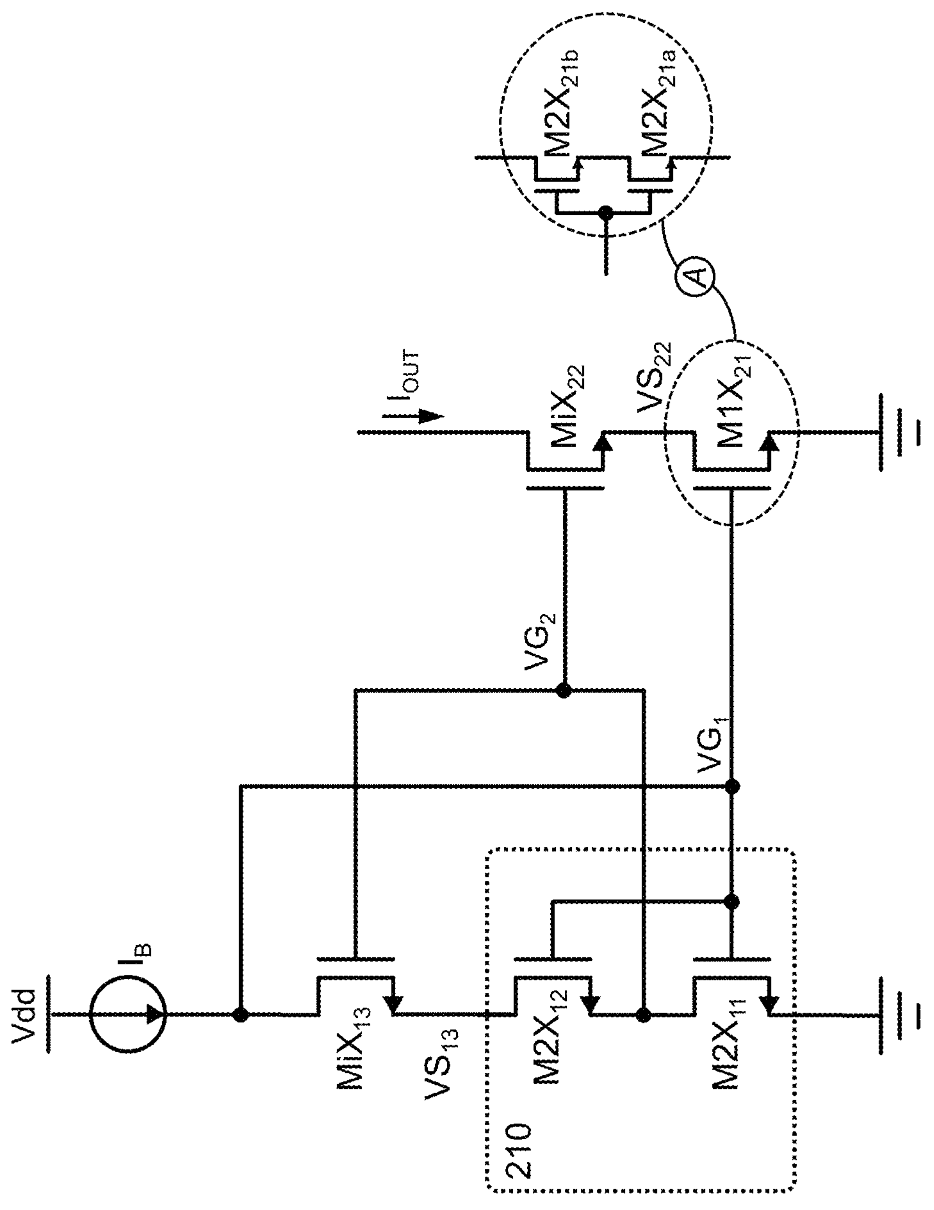
FIG. 2 shows a simplified schematic of a cascode current mirror according to an embodiment of the present disclosure.

Teachings according to the present disclosure address design tradeoffs described above with reference to the configurations (100*a*) and (100*b*). In particular, FIG. 2 shows a simplified schematic of a cascode current mirror (200) according to an embodiment of the present disclosure. The cascode current mirror (200) includes an input leg, (210, $MiX_{13}$, e.g., reference branch), comprising series-connected transistors $M2X_{11}$, $M2X_{12}$, and $MiX_{13}$. A (reference) current source, $I_B$, is coupled to the input leg (210, $MiX_{13}$). During operation, a current, $I_B$, that flows from the current source, $I_B$, through the input leg (210, $MiX_{13}$) is mirrored by the output leg ($M1X_{21}$, $MiX_{22}$) and output as an output (sink) current, $I_{OUT}$.

With continued reference to FIG. 2, according to some embodiments of the present disclosure, the transistor $MiX_{13}$ of the input leg (210, $MiX_{13}$) and the transistor $MiX_{22}$ of the output leg ($M1X_{21}$, $MiX_{22}$) are intrinsic transistors. On the other hand, transistors $M2X_{11}$ and $M2X_{12}$ that make up element (210) of the input leg (210, $MiX_{13}$) and transistor $M1X_{21}$ of the output leg ($M1X_{21}$, $MiX_{22}$) are regular transistors. Furthermore, a size (e.g., 2×) of the transistors $M2X_{11}$ and $M2X_{12}$ is twice the size (e.g., 1×) of the transistors $MiX_{13}$, $M1X_{21}$, and $MiX_{22}$.

As shown in FIG. 2, the gates of the transistors $M2X_{11}$ and $M2X_{12}$ are connected to one another, and a drain of the transistor $M2X_{11}$ is connected to a source of the transistor $M2X_{12}$. Accordingly, the element (210) may be considered a composite transistor (210) having a source provided by a source of the transistor $M2X_{11}$, a drain provided by a drain of the transistor $M2X_{12}$, and a gate provided by the common gates (e.g., node carrying voltage $VG_1$) of the transistors $M2X_{11}$ and $M2X_{12}$. Furthermore, because the composite transistor (210) may include a width, $W_{210}$, that is equal to a width, $W_2$, of each of the transistors $M2X_{11}$ and $M2X_{12}$, and a length, $L_{210}$, that is the sum of the lengths, $L_2+L_2$, of the transistors $M2X_{11}$ and $M2X_{12}$, then the size, $W_{210}/L_{210}$, of the composite transistor (210) may be equal to $W_2/(L_2+L_2)$, or in other words, equal to half the size (2×) of each of the transistors $M2X_{11}$ and $M2X_{12}$, which is equal to the size (1×) of each of the transistors, $MiX_{13}$, $M1X_{21}$, and $MiX_{22}$.

With continued reference to FIG. 2, the composite transistor (210) is in series connection with the (cascode) intrinsic transistor $MiX_{13}$. Similar to the configurations (100*a*, 100*b*) described above with reference to FIGS. 1A/1B, the gate voltage, $VG_1$, self-establishes for conduction of the input current, $I_B$, through the composite transistor (210) based on, for example, current-voltage characteristics (e.g., I-V curves) of the transistors $M2X_{11}$ and $M2X_{21}$. In turn, the gate voltage, $VG_1$, is used to bias the transistor $M1X_{21}$ of the output leg ($M1X_{21}$, $MiX_{22}$) for conduction of the output current, $I_{OUT}$. In other words, the Vgs voltage of the common-source composite transistor (210) of the input leg (210, $MiX_{13}$) is (e.g., exactly or nearly exactly) equal to the Vgs voltage of the common-source transistor $M1X_{21}$ of the output leg ($M1X_{21}$, $MiX_{22}$). Accordingly, since the transistors (210) and $M1X_{21}$ may be matched (e.g., same current-voltage characteristics and size), then for an equal value of the Vds voltages of such transistors (e.g., $VS_{13}=VS_{22}$), the current $I_{OUT}$ through the transistor $M1X_{21}$ may be (e.g., exactly or nearly exactly) equal to the current $I_B$ through the transistor (210).

As shown in FIG. 2, a voltage, $VG_2$, at an intermediate node between the two series-connected transistors $M2X_{11}$ and $M2X_{12}$, or in other words, a node that connects/couples a drain of the transistor $M2X_{11}$ to a source of the transistor $M2X_{12}$, is used as a gate voltage to bias the intrinsic transistors $MiX_{13}$ and $MiX_{22}$ of the input leg (210, $M2X_{11}$) and the output leg ($M1X_{21}$, $MiX_{22}$). Accordingly, since the transistors $MiX_{13}$ and $MiX_{22}$ may be matched (e.g., same current-voltage characteristics and size), then for an equal current to flow through such transistors (e.g., $I_B=I_{OUT}$), a same Vgs voltage establishes for both transistors, and therefore the voltage $VS_{13}$ becomes equal to the voltage $VS_{22}$ (e.g., $VS_{13}=VS_{22}$). In other words, the voltage, $VG_2$, establishes an equal value of the Vds voltages of the transistors (210) and $M1X_{21}$, and therefore, as described above, the current $I_{OUT}$ through the transistor $M1X_{21}$ may be (e.g., exactly or nearly exactly) equal to the current $I_B$ through the transistor (210).

Furthermore, because the transistor $M1X_{21}$ is intrinsic, and therefore includes a negative $V_{th}$, then the voltage $VS_{13}$, and therefore the Vds of the transistor (210) may be larger than the voltage $VG_2$, which may allow a sufficiently large and positive Vds voltage for operation of the transistors $M2X_{11}$ and $M2X_{12}$. For example, assuming that the voltage $VG_2$ is about positive 20-30 millivolts and the $V_{th}$ of the intrinsic transistor about negative 220 millivolts, then the voltage $VS_{13}$, and therefore the Vds of the transistor (210), may be about positive 140-150 millivolts for an overdrive voltage, $V_{OV}$, of about positive 100 millivolts. Accordingly, the Vds of the transistor $M1X_{21}$ of the output leg, which is equal to the Vds of the transistor (210) of the input leg, is also about positive 140-150 millivolts.

It follows that the configuration (200) of FIG. 2 allows for a lower headroom voltage of operation of the output leg ($M1X_{21}$, $MiX_{22}$) that is comparable, for example, to the headroom voltage described above with reference to the configuration (100*b*) of FIG. 1B, but without mismatch of the Vds voltages of the common-source transistors of the input/output legs. Furthermore, the input leg (210, $M2X_{11}$) of the configuration (200) includes a similarly low headroom voltage of operation that allows operation from a supply voltage, Vdd, that is as low as 1.2 volts or lower.

It is noted that use of the intrinsic transistors ($MiX_{13}$, $MiX_{22}$) as cascode transistors in the cascode current mirror (200) of FIG. 2 may be used for operation of said current mirror, which in turn allows use of a (low) voltage $VG_2$ at the intermediate node between the two series-connected transistors $M2X_{11}$ and $M2X_{12}$ for biasing of the cascode transistors, which in turn allows operation of each of the input and output legs at low headroom voltages that are about two times the overdrive voltage of the transistors (e.g., headroom voltages in a range from 200-250 millivolts).

According to some embodiments of the present disclosure, and as shown in detail A of FIG. 2, the common-source transistor $M1X_{21}$ of the output leg ($M1X_{21}$, $MiX_{22}$) may be a composite transistor that includes series-connected transistors $M2X_{21a}$ and $M2X_{21b}$ that are respectively matched (e.g., in current-voltage characteristics and size) to the series-connected transistors $M2X_{11}$ and $M2X_{12}$ that make up the composite transistor (210) of the input leg (210, $MiX_{13}$). This in turn can allow for better overall matching of the two common-source (composite) transistors (210) and $M1X_{21}$.

With continued reference to FIG. 2, the transistors shown in FIG. 2 may be designed for operation according to desired/specific parameter values, including, for example, currents (e.g., $I_B$ and $I_{OUT}$) and threshold/overdrive voltages. Such parameter values may further be in view of a required operation of the common-source transistors in their respective saturation regions. Relationships between (drain) current ($I_D$), threshold voltage ($V_{th}$), gate-to-source voltage ($V_{gs}$), overdrive voltage ($\Delta$), transistor width (W), and transistor length (L) of a FET transistor are provided by the following (general) equations (1) and (2):

$$I_D = \frac{K'}{2}\frac{W}{L}\Delta^2 \qquad \text{Equation (1)}$$

$$\Delta = V_{gs} - V_{th} = \sqrt{\frac{2I_D}{K'\frac{W}{L}}} \qquad \text{Equation (2)}$$

wherein K and K' are well established FET process parameters.

Accordingly, applying the above equations to nodes carrying the voltages $VG_1$, $VG_2$, $VS_{13}$ and $VS_{22}$ shown in FIG. 2, the following equations (3), (4) and (5) are obtained:

$$VG_1 = V_{th} + \sqrt{\frac{2I_B}{K'\frac{W}{L}}} \qquad \text{Equation (3)}$$

$$VG_2 = V_{th} + \sqrt{\frac{2I_B}{K'\frac{W}{L}}} - \left(V_{th} + \sqrt{\frac{2I_B}{K'\frac{W}{L}}}\right) = \left(1 - \frac{1}{\sqrt{2}}\right)\Delta \qquad \text{Equation (4)}$$

$$VS_{13} = VS_{22} = VG_2 - V_{gsi} = VG_2 - \left(V_{thi} + \sqrt{\frac{2I_B}{K_i'\frac{W}{L}}}\right) = VG_2 - (V_{thi} + \Delta_i) \qquad \text{Equation (5)}$$

wherein:

$V_{th}$ denoted the threshold voltage of the regular transistors, $\Delta$ denoted the overdrive voltage of the regular transistors, $V_{thi}$ denoted the threshold voltage of the intrinsic transistors, and $V_{gsi}$ denoted the gate-to-source voltage of the intrinsic transistors.

As previously described in the present application, some advantageous arrangements for maintaining a FET transistor in its saturation region of operation can be provided by: $Vds > Vgs - V_{th}$. According, since $Vds = VS_{13}$, and $Vgs = VG_1$, then, when applied to the above equations (1)-(5), the following inequality (6) is obtained:

$$\left(1 - \frac{1}{\sqrt{2}}\right)\Delta - V_{thi} - \Delta_i > \Delta \Rightarrow -\sqrt{2}(V_{thi} + \Delta_i) > \Delta \qquad (6)$$

which establishes a relationship between the overdrive voltage ($\Delta$) of the regular transistors (e.g., $M2X_{11}$, $M2X_{12}$, $M1X_{21}$) and the overdrive voltage ($\Delta_i$) and threshold voltage ($V_{thi}$) of the intrinsic transistors (e.g., $MiX_{13}$, $MiX_{22}$), for operation of the cascode current mirror (200) of FIG. 2. In other words, by fabricating/designing the regular transistors (e.g., $M2X_{11}$, $M2X_{12}$, $M1X_{21}$) and the intrinsic transistors (e.g., $MiX_{13}$, $MiX_{22}$) to include threshold/overdrive voltages according to the inequality (6), operation of each of the transistors (210, $MiX_{13}$, $M1X_{21}$, $MiX_{22}$) in their respective saturation regions is expected. On the other hand, as clearly shown by equation (4), the voltage $VG_2$, which is equal to the Vds of the transistor $M2X_{11}$, is smaller than the overdrive voltage of such transistor. In other words, during operation of the cascode current mirror (200) of FIG. 2, the transistor $M2X_{11}$ operates in its triode region whereas all other transistors operate in their saturation region. It is noted that although the above equations are written in terms of the width, W, and the length, L, of the transistors (e.g., 1×/2× label prefixes indicating ratios of W to L), one may write the equations in terms of ratios and generalize for different sizes (e.g., scaling) of the transistors.

The configuration (200) described above with reference to FIG. 2 may be expanded for higher stacks in order to, for example, withstand higher voltages at the output leg and/or to increase output leg impedance. One such exemplary configuration is shown in FIG. 3.

Figure 3:
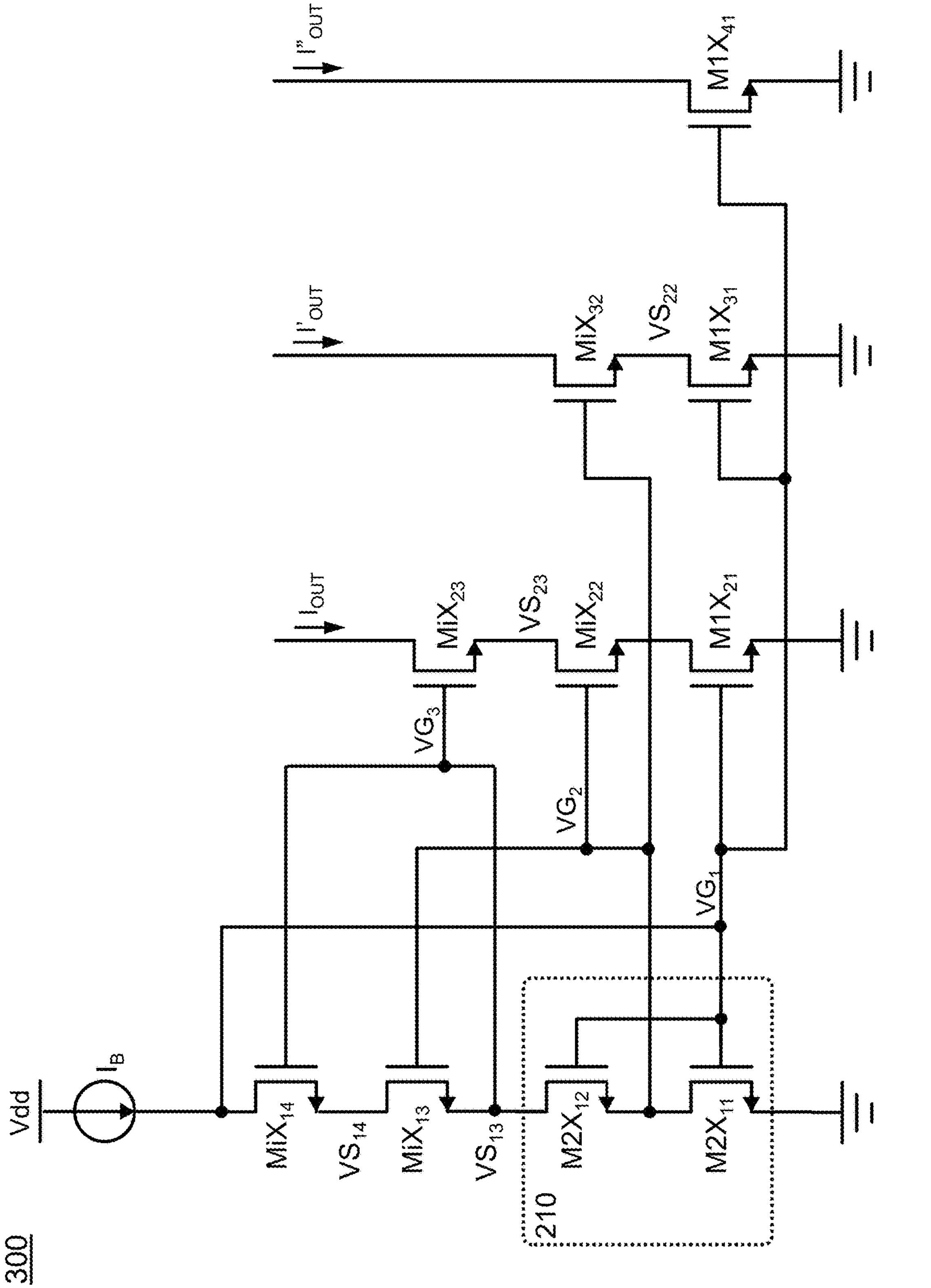
FIG. 3 shows a simplified schematic of a cascode current mirror according to an embodiment of the present disclosure, the casode current mirror including a plurality of output legs.

FIG. 3 shows a simplified schematic of a cascode current mirror (300) according to an embodiment of the present disclosure, the casode current mirror including a plurality of (parallel) output legs for outputting mirrored currents $I'_{OUT}$, $I''_{OUT}$ and Foul. As shown in FIG. 3, a first output leg ($M1X_{21}$, $MiX_{22}$, $MiX_{22}$), that outputs the current $I_{OUT}$, includes a stacked cascode arrangement having a stack height of three, a second output leg ($M1X_{31}$, $MiX_{32}$), that outputs the current $I'_{OUT}$, includes a stacked cascode arrangement having a stack height of two, and a third output leg ($M1X_{41}$), that outputs the current $I''_{OUT}$, includes a single transistor. It is noted that the three output legs of the cascode current mirror (300) may operate independently from one another as their operation is solely based on gate biasing voltages (e.g., $VG_1$, $VG_2$, $VG_3$) generated by the input leg (210, $MiX_{13}$, $MiX_{14}$). Furthermore, configurations based on the configuration (300) of the FIG. 3 but without one or more of the shown output legs are possible (e.g., per FIG. 4 later described).

With continued reference to FIG. 3, principle of operation of the cascode current mirror (300) is similar to one described above with reference to FIG. 2, including use of the composite transistor (210) that includes transistors ($M2X_{11}$, $M2X_{21}$) having twice the size of the other transistors. Likewise, voltages at nodes $VG_1$, $VG_2$, $VG_3$, $VS_{13}$, $VS_{14}$, $VS_{22}$ and $VS_{23}$ shown in FIG. 3 may be obtained via the equations (1) and (2) as described above. In particular, the equations (3)-(5) and inequality (6) described above with reference to nodes shown in FIG. 2 may equally apply to same nodes shown in FIG. 3. In other words, similar to the configuration (200) of FIG. 2, all of the transistors of the configuration (300), at the exception of the transistor $M2X_{11}$, may operate in their respective regions of saturation. Because of the different stack heights of the three output legs (e.g., $I_{OUT}$, $I'_{OUT}$, I"OUT) shown in FIG. 3, different output impedances, voltage swings and voltage withstand capabilities may be provided at the output legs.

Figure 4:
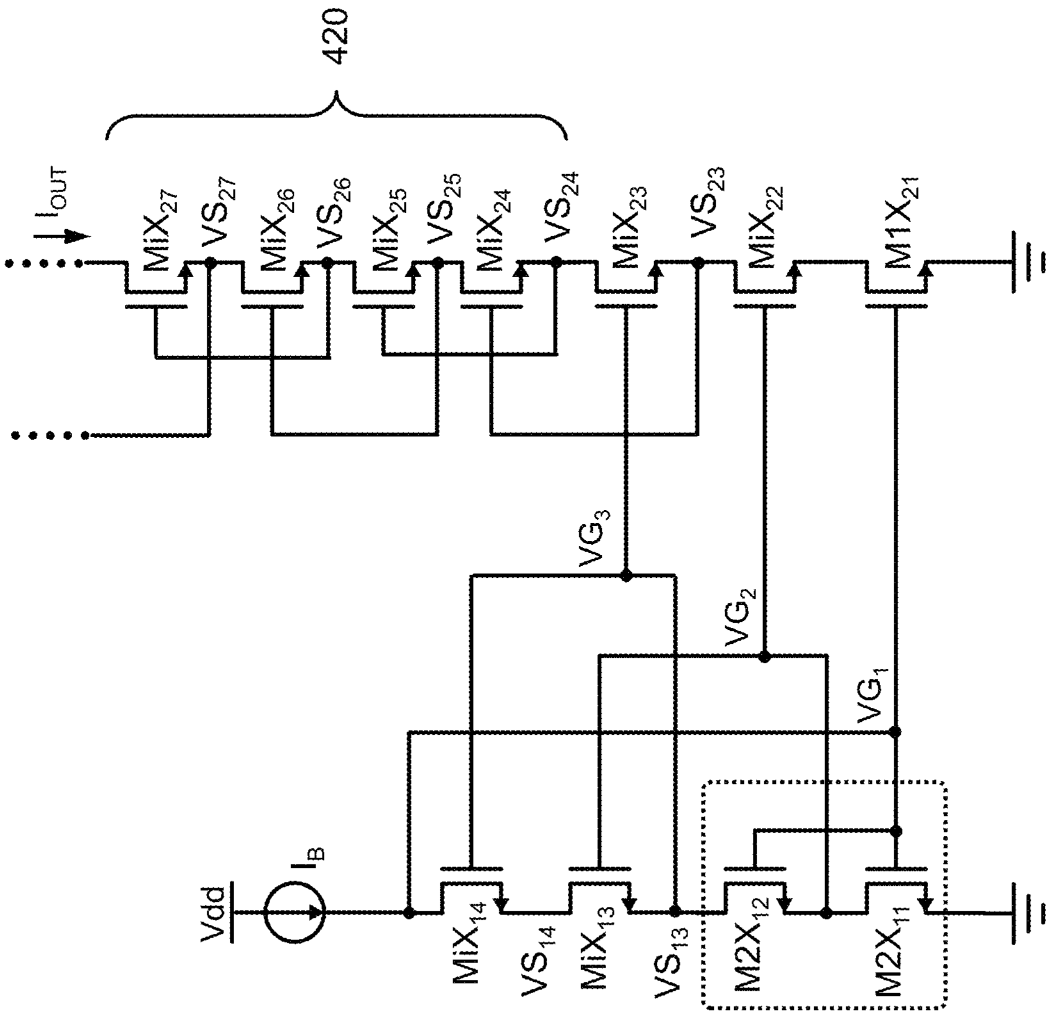
FIG. 4 shows a simplified schematic of a cascode current mirror according to another embodiment of the present disclosure, the cascode current mirror configured for a higher output voltage at the output leg.

According to some embodiments of the present disclosure, increased voltage withstand capability at an output leg (e.g, $I_{OUT}$ of FIG. 3) may be provided via one or more series-connected transistors that are configured to self-bias. This is shown in FIG. 4, wherein a self-biased stack (420) of series-connected intrinsic transistors ($MiX_{24}$, . . . , $MiX_{27}$, . . . ) is coupled to the output leg ($M1X_{21}$, $MiX_{22}$, $MiX_{23}$). Accordingly, a (aggregate Vds, e.g., 100-150 millivolts per transistor) voltage drop across the self-biased stack (420) may allow for a higher voltage to couple to the output leg, including a voltage that is higher than a technology rating voltage (e.g., withstand voltage) of the transistors at the output leg. Because the stack (420) is self-biased, no additional biasing voltages may be generated by the input leg (210, $MiX_{13}$, $MiX_{14}$).

As shown in FIG. 4, self-biasing of a transistor of the series-connected intrinsic transistors ($MiX_{24}$, . . . , $MiX_{27}$, . . . ) may be provided by coupling a gate of the transistor to a source of an adjacent transistor whose drain is connected (e.g., directly coupled) to a source of the transistor. For example, considering the intrinsic transistor $MiX_{25}$ whose source is connected to the drain of the adjacent (intrinsic) transistor $MiX_{24}$, then self-biasing of the intrinsic transistor $MiX_{25}$ may be provided by connecting its gate to the source of the adjacent (intrinsic) transistor $MiX_{24}$. Because the self-biasing is provided by coupling the gates of the transistors to voltages that are smaller than voltages at the respective sources of the transistors, use of intrinsic transistors may be advantageous in some embodiments.

According to an exemplary embodiment of the present disclosure, the series-connected intrinsic transistors ($MiX_{24}$, . . . , $MiX_{27}$, . . . ) of the self-biased stack (420) may advantageously include source-body tied transistor devices that include bodies that are tied to the respective sources. Some advantages obtained by such source-body tied transistor device may include increased stability of the threshold voltage ($V_{th}$) of the device and therefore provide for a more stable self-biasing scheme.

It should be noted that teachings according to the present disclosure may not be limited to a cascode current mirror (e.g., FIGS. 3-4) having input/output legs configured to sink input/output currents via n-type FET transistor devices, rather, the present teachings equally apply to a cascode current mirror having input/output legs configured to source input/output currents via p-type FET transistor devices. Such p-type configuration may be considered a dual or complementary configuration to the n-type configuration described above.

Figure 5:
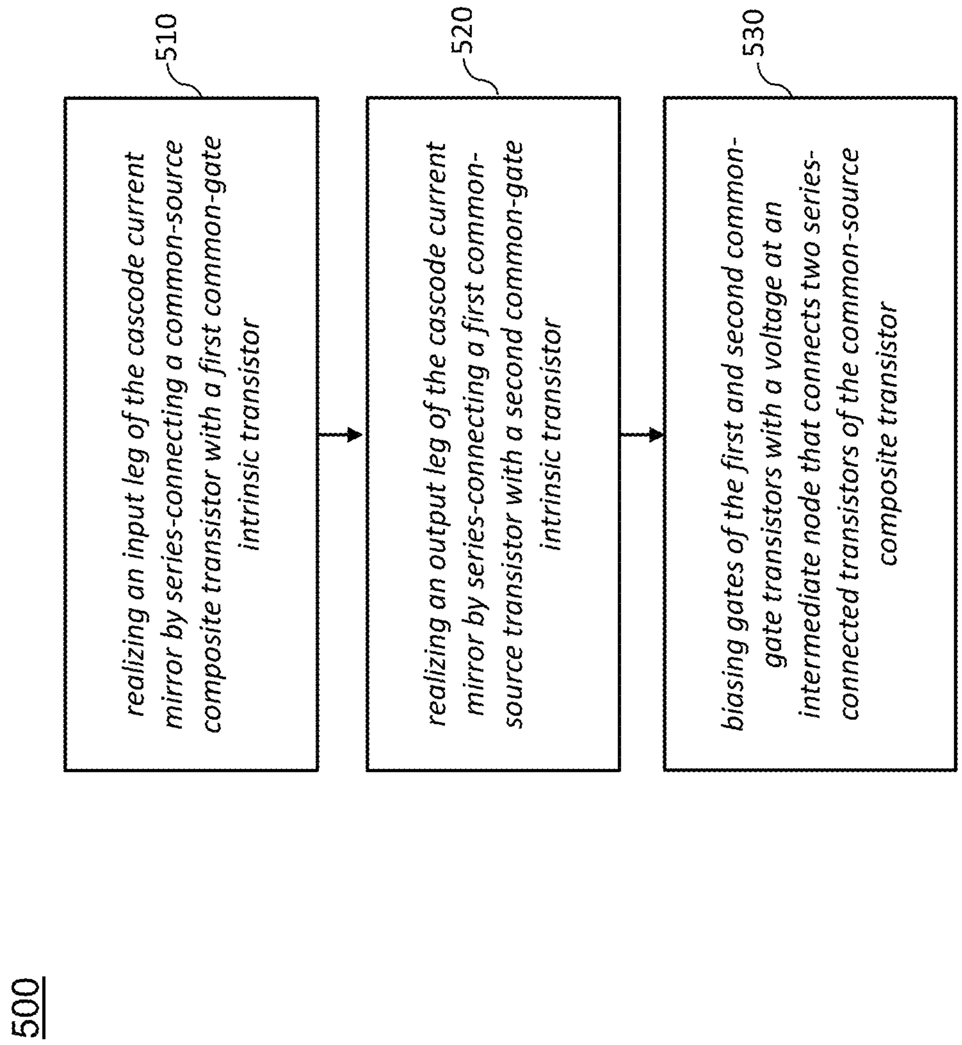
FIG. 5 is a process chart showing various steps of a method according to an embodiment of the present disclosure for operating a cascode current mirror with low headroom voltage.

FIG. 5 is a process chart (500) showing various steps of a method for operating a cascode current mirror with low headroom voltage. As can be seen in the process chart (500), the method comprises: realizing an input leg of the cascode current mirror by series-connecting a common-source composite transistor with a first common-gate intrinsic transistor, per step (510), realizing an output leg of the cascode current mirror by series-connecting a first common-source transistor with a second common-gate intrinsic transistor, per step (520), and biasing gates of the first and second common-gate transistors with a voltage at an intermediate node that connects two series-connected transistors of the common-source composite transistor, per step (530), wherein a ratio between a width and a length of each transistor of the two series-connected transistors is twice a ratio between a width and a length of any one of the first common-source transistor, the first common-gate intrinsic transistor, or the second common-gate intrinsic transistor.

Applications that may include the novel apparatus and systems of various embodiments include electronic circuitry used in high-speed computers, communication and signal processing circuitry, modems, single or multi-processor modules, single or multiple embedded processors, data switches, and application-specific modules, including multilayer, multi-chip modules. Such apparatus and systems may further be included as sub-components within a variety of electronic systems, such as televisions, cellular telephones, personal computers (e.g., laptop computers, desktop computers, handheld computers, tablet computers, etc.), workstations, radios, video players, audio players (e.g., mp3 players), vehicles, medical devices (e.g., heart monitor, blood pressure monitor, etc.) and others. Some embodiments may include a number of methods.

The term "MOSFET" technically refers to metal-oxide-semiconductor-field-effect-transistor; another synonym for MOSFET is "MISFET", for metal-insulator-semiconductor FET. However, "MOSFET" has become a common label for most types of insulated-gate FETs ("IGFETs"). Despite that, it is well known that the term "metal" in the names MOSFET and MISFET is now often a misnomer because the previously metal gate material is now often a layer of polysilicon (polycrystalline silicon). Similarly, the "oxide" in the name MOSFET can be a misnomer, as different dielectric materials are used with the aim of obtaining strong channels with smaller applied voltages. Accordingly, the term "MOSFET" as used herein is not to be read as literally limited to metal-oxide-semiconductor FETs, but instead includes IGFETs in general.

As should be readily apparent to one of ordinary skill in the art, various embodiments of the invention can be implemented to meet a wide variety of specifications. Unless otherwise noted above, selection of suitable component values is a matter of design choice and various embodiments of the invention may be implemented in any suitable IC technology (including but not limited to MOSFET and IGFET structures), or in hybrid or discrete circuit forms. Integrated circuit embodiments may be fabricated using any suitable substrates and processes, including but not limited to standard bulk silicon, silicon-on-insulator (SOI), silicon-on-sapphire (SOS), GaN HEMT, GaAs pHEMT, and MESFET technologies. However, the inventive concepts described above are particularly useful with an SOI-based fabrication process (including SOS), and with fabrication processes having similar characteristics. Fabrication in CMOS on SOI or SOS enables low power consumption, the ability to withstand high power signals during operation due to FET stacking, good linearity, and high frequency operation (in excess of about 10 GHz, and particularly above about 20 GHz). Monolithic IC implementation is particularly useful since parasitic capacitances generally can be kept low (or at a minimum, kept uniform across all units, permitting them to be compensated) by careful design.

Voltage levels may be adjusted or voltage and/or logic signal polarities reversed depending on a particular specification and/or implementing technology (e.g., NMOS, PMOS, or CMOS, and enhancement mode or depletion mode transistor devices). Component voltage, current, and power handling capabilities may be adapted as needed, for example, by adjusting device sizes, serially "stacking" components (particularly FETs) to withstand greater voltages, and/or using multiple components in parallel to handle greater currents. Additional circuit components may be added to enhance the capabilities of the disclosed circuits and/or to provide additional functions without significantly altering the functionality of the disclosed circuits.

The examples set forth above are provided to give those of ordinary skill in the art a complete disclosure and description of how to make and use the embodiments of the gate drivers for stacked transistor amplifiers of the disclosure and are not intended to limit the scope of what the applicant considers to be the invention. Such embodiments may be, for example, used within mobile handsets for current communication systems (e.g., WCDMA, LTE, WiFi, etc.) wherein amplification of signals with frequency content of above 100 MHz and at power levels of above mW may be required. The skilled person may find other suitable implementations of the presented embodiments.

Modifications of the above-described modes for carrying out the methods and systems herein disclosed that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only and is not intended to be limiting. As used in this specification and the appended claims, the singular forms "a", "an", and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

A number of embodiments of the disclosure have been described. Nevertheless, it will be understood that various modifications can be made without departing from the spirit and scope of the present disclosure. Accordingly, other embodiments are within the scope of the following claims.

The invention claimed is:

1. A cascode current mirror circuit, comprising:
- an input leg comprising a common-source composite transistor in series connection with a first common-gate intrinsic transistor; and
- an output leg comprising a first common-source transistor in series connection with a second common-gate intrinsic transistor,
- wherein
  - the common-source composite transistor comprises two series-connected transistors with gates directly connected to a gate node of the common-source composite transistor, and
  - an intermediate node that connects the two series-connected transistors is connected to gates of the first and second common-gate intrinsic transistors.

2. The cascode current minor circuit according to claim 1, wherein:
- a ratio between a width and a length of each transistor of the two series-connected transistors is twice a ratio between a width and a length of the first common-source transistor.

3. The cascode current minor circuit according to claim 1, wherein:
- a ratio between a width and a length of each transistor of the first common-source transistor, the first common-gate intrinsic transistor, and the second common-gate intrinsic transistor, is equal to S, and
- a ratio between a width and a length of each transistor of the two series-connected transistors is equal to two times S.

4. The cascode current minor circuit according to claim 1, wherein:
- the gate node of the common-source composite transistor is connected to a gate of the first common-source transistor and to a drain of the first common-gate intrinsic transistor.

5. The cascode current minor circuit according to claim 4, wherein:
- a source of the first common-gate intrinsic transistor is connected to a drain node of the common-source composite transistor, and
- a source of the second common-gate intrinsic transistor is connected to a drain node of the first common-source transistor.

6. The cascode current minor circuit according to claim 4, further comprising:
- a current source coupled to the drain of the first common-gate intrinsic transistor.

7. The cascode current minor circuit according to claim 1, wherein:
- the two series-connected transistors of the common-source composite transistor include a second common-source transistor in series connection with a first common-gate transistor, and
- a drain of the second common-source transistor and a source of the first common-gate transistor are connected to the intermediate node.

8. The cascode current minor circuit according to claim 7, wherein:
- during operation of the cascode current mirror circuit, a voltage at the intermediate node is smaller than an overdrive voltage of the second common-source transistor so to operate the second common-source transistor in a triode region.

9. The cascode current minor circuit according to claim 7, wherein:
- during operation of the cascode current mirror circuit, a difference between a voltage at a drain of the first common-gate transistor and a voltage at the intermediate node is greater than an overdrive voltage of the first common-gate transistor so to operate the first common-gate transistor in a saturation region.

10. The cascode current mirror circuit according to claim 1, wherein:
- the first common-gate intrinsic transistor and the second common-gate intrinsic transistor comprise respective negative threshold voltages, and
- each transistor of the two series-connected transistors and the first common-source transistor comprise respective positive threshold voltages.

11. The cascode current mirror circuit according to claim 10, wherein:
- the respective negative threshold voltages are in a range from negative 200 millivolts to negative 250 millivolts.

12. The cascode current mirror circuit according to claim 1, wherein:

the first common-source transistor is a composite transistor that includes two series-connected transistors having their respective gates connected.

13. The cascode current mirror circuit according to claim 1, wherein:

the input leg further comprises a third common-gate intrinsic transistor in series connection with the first common-gate intrinsic transistor; and the output leg further comprises a fourth common-gate intrinsic transistor in series connection with the second common-gate intrinsic transistor.

14. The cascode current mirror circuit according to claim 13, wherein:

the gate node of the common-source composite transistor is connected to a gate of the first common-source transistor and to a drain of the third common-gate intrinsic transistor, and a drain node of the common-source composite transistor is connected to a gate of the third common-gate intrinsic transistor and to a gate of the fourth common-gate intrinsic transistor.

15. The cascode current mirror circuit according to claim 13, further comprising:

an additional output leg comprising a third common-source transistor, wherein a gate of the third common-source transistor is connected to the gate node of the common-source composite transistor.

16. The cascode current mirror circuit according to claim 15, wherein:

the additional output leg further comprises a fifth common-gate intrinsic transistor in series connection with the third common-source transistor, wherein a gate of the fifth common-gate intrinsic transistor is connected to the intermediate node.

17. The cascode current mirror circuit according to claim 1, wherein:

the output leg further comprises a self-biased stack of a plurality of series-connected intrinsic transistors, the self-biased stack in series connection with the second common-gate intrinsic transistor, wherein for each transistor of the plurality of series-connected intrinsic transistors of the self-biased stack:

a source node of the each transistor is connected to a drain node of an adjacent intrinsic transistor, the adjacent intrinsic transistor being a transistor of the plurality of series-connected intrinsic transistors of the self-biased stack or the second common-gate intrinsic transistor, and a gate node of the each transistor is connected to a source node of the adjacent intrinsic transistor.

18. The cascode current mirror circuit according to claim 7, wherein:

each transistor of the plurality of series-connected intrinsic transistors of the self-biased stack comprises a source-body tied transistor.

19. A method for operating a cascode current mirror with low headroom voltage, the method comprising:

realizing an input leg of the cascode current mirror by series-connecting a common-source composite transistor with a first common-gate intrinsic transistor;

realizing an output leg of the cascode current mirror by series-connecting a first common-source transistor with a second common-gate intrinsic transistor; and biasing gates of the first and second common-gate transistors with a voltage at an intermediate node that connects two series-connected transistors of the common-source composite transistor, wherein a ratio between a width and a length of each transistor of the two series-connected transistors is twice a ratio between a width and a length of any one of the first common-source transistor, the first common-gate intrinsic transistor, or the second common-gate intrinsic transistor, and the common-source composite transistor comprises two series-connected transistors with gates directly connected to a gate node of the common-source composite transistor.

20. The method according to claim 19, wherein:

the first common-gate intrinsic transistor and the second common-gate intrinsic transistor comprise respective negative threshold voltages, and each transistor of the two series-connected transistors and the first common-source transistor comprise respective positive threshold voltages.

* * * * *